(12) United States Patent
Hsiao et al.

(10) Patent No.: US 9,160,422 B2
(45) Date of Patent: Oct. 13, 2015

(54) DATA CAPTURING METHOD OF NFC PROTOCOL AND NFC ELECTRONIC DEVICE USING THE SAME

(71) Applicants: Chung-Liang Hsiao, Taipei (TW); Chih-Yi Chen, Taipei (TW); Yuan-Jui Huang, Taipei (TW)

(72) Inventors: Chung-Liang Hsiao, Taipei (TW); Chih-Yi Chen, Taipei (TW); Yuan-Jui Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 158 days.

(21) Appl. No.: 14/082,194

(22) Filed: Nov. 18, 2013

(65) Prior Publication Data

US 2014/0141717 A1    May 22, 2014

Related U.S. Application Data

(60) Provisional application No. 61/729,402, filed on Nov. 22, 2012.

(30) Foreign Application Priority Data

Sep. 12, 2013    (CN) .......................... 2013 1 0415379

(51) Int. Cl.
*H04B 5/00* (2006.01)

(52) U.S. Cl.
CPC ............ *H04B 5/0062* (2013.01); *H04B 5/0031* (2013.01)

(58) Field of Classification Search
CPC .... H04B 5/0031; H04B 5/0062; H04W 4/008
USPC ........... 455/41.1, 41.2, 41.3, 168.1; 340/10.1, 340/10.3, 10.4, 10.42
See application file for complete search history.

(56) References Cited

U.S. PATENT DOCUMENTS

| 2009/0187763 | A1* | 7/2009 | Freericks et al. | ............. 713/167 |
| 2011/0093950 | A1* | 4/2011 | Bhargava et al. | ............... 726/21 |
| 2011/0276961 | A1 | 11/2011 | Johansson et al. | |
| 2012/0017213 | A1* | 1/2012 | Hunt et al. | .................... 718/100 |

FOREIGN PATENT DOCUMENTS

CN    101335951    12/2008

* cited by examiner

*Primary Examiner* — Tuan Pham
(74) *Attorney, Agent, or Firm* — Jianq Chyun IP Office

(57) ABSTRACT

A data capturing method of near-field communication (NFC) protocol and an NFC electronic device thereof are provided. The method can be applied to an NFC electronic device with an operation system, and the operation system includes a kernel mode and a user mode. The method includes following steps: detecting a readable element by an interface drive module in the kernel mode to obtain NFC original data transferred by the readable element; capturing the NFC original data from the interface drive module by a capturing module and outputting the NFC original data to an analyzing module in the user mode; and analyzing the NFC original data by the analyzing module to obtain NFC target data.

10 Claims, 4 Drawing Sheets

DATA CAPTURING METHOD OF NFC PROTOCOL AND NFC ELECTRONIC DEVICE USING THE SAME

CROSS-REFERENCE TO RELATED APPLICATION

This application claims the priority benefit of U.S. provisional application Ser. No. 61/729,402, filed on Nov. 22, 2012 and CN application serial No. 201310415379.8, filed on Sep. 12, 2013. The entirety of each of the above-mentioned patent applications are hereby incorporated by reference herein and made a part of specification.

BACKGROUND OF THE INVENTION

1. Field of the Invention

The invention relates to a data capturing method and an electronic device and, more particularly, to a data capturing method of near-field communication (NFC) protocol and an NFC electronic device using the same.

2. Description of the Related Art

Electronic devices communicates with each other in a near-field can be archived via Near field communication (NFC) which is a principle of magnetic induction that developed from an integration of radio frequency identification (RFID) and interconnection technology. The NFC technology permits two electronic devices to execute a point-to-point connection and a communication protocol when the devices exist nearby or close contact with each other, so as to perform data exchange.

The NFC technology can achieve data exchange without a cable, and additionally, it also has many advantageous in application. Since two devices can communicate with each other in a close proximity under NFC, data exchange becomes more intuitive and rapid. Furthermore, since a physical connection is not needed in the NFC, the transmission security is relatively high, which is a better choice in electronic payment and ticket payment.

However, application programs in a user mode cannot get detailed information relating to the NFC protocol, such as a unique identification (UID) or types of an NFC smart card, via a proximity application programming interface (APIs) provided in the Windows operation system.

BRIEF SUMMARY OF THE INVENTION

A data capturing method of NFC protocol and an NFC electronic device thereof are provided. They can capture original data relating to the NFC protocol to an application program module in a user mode, which improves the flexibility and convenience of NFC.

The data capturing method of the NFC protocol is applied to an electronic device. The electronic device has an operation system, and the operation system includes a kernel mode and a user mode. The method includes following steps: detecting a readable element in the kernel mode; capturing and outputting NFC original data of the readable element; and analyzing the NFC original data in the user mode to obtain NFC target data.

The NFC electronic device has an operation system, and the operation system includes a kernel mode and a user mode. The NFC electronic device includes an interface drive module, a capturing module and an analyzing module. The interface drive module is disposed in the kernel mode, and detects a readable element to obtain NFC original data transmitted by the readable element. The capturing module captures the NFC original data from the interface drive module and outputs the NFC original data. The analyzing module is disposed in the user mode, receives the NFC original data outputted by the capturing module and analyzes the NFC original data to obtain NFC target data.

As stated above, the data capturing method of NFC protocol and the NFC electronic device thereof can obtain application program modules of the NFC electronic device without changing application program interfaces provided by the operation system, and improve the using flexibility and convenience in NFC via NFC protocol specification data. Moreover, if tags of the readable element and the account information of the operation system login process are integrated, the user does not need to input the account information manually, which simplifies the login process.

These and other features, aspects and advantages of the present invention will become better understood with regard to the following description, appended claims, and accompanying drawings.

DETAILED DESCRIPTION OF THE EMBODIMENTS

Figure 1A:
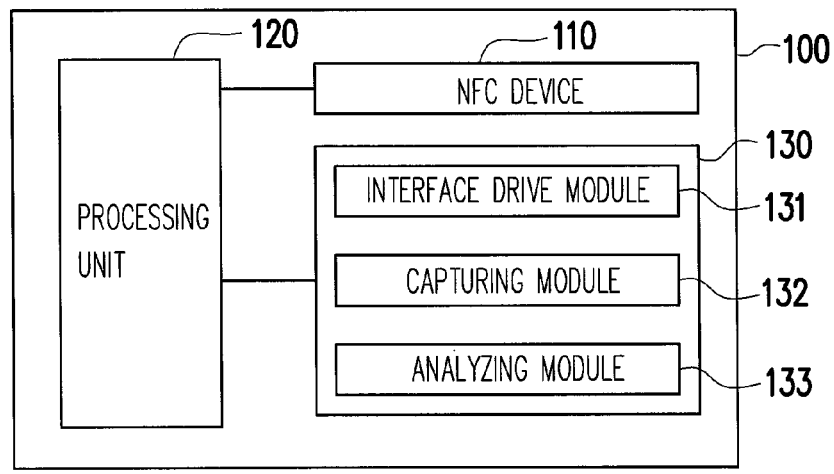
FIG. 1A is a block diagram showing an NFC electronic device in an embodiment.
Figure 1B:
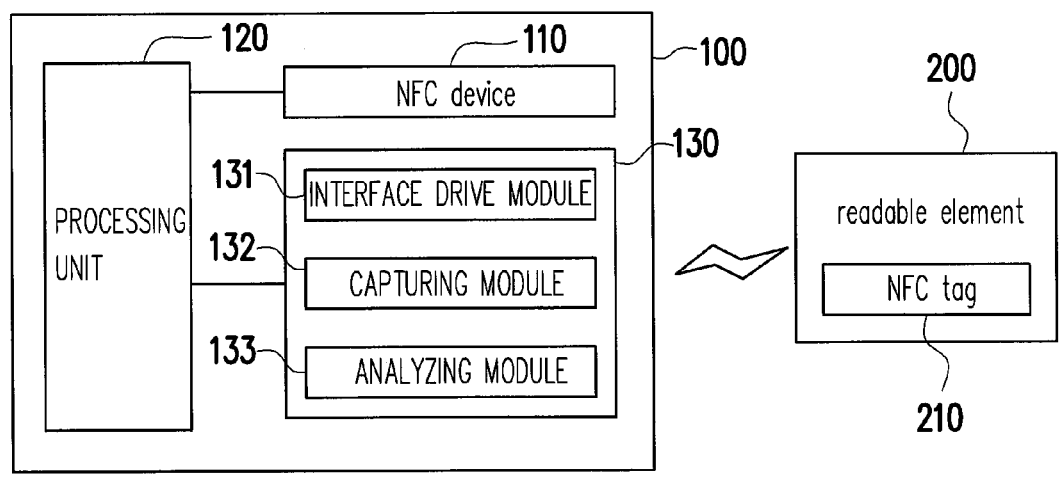
FIG. 1B is a schematic diagram showing a data capturing method of NFC protocol in an embodiment.

FIG. 1A is a block diagram showing a near-field communication (NFC) electronic device in an embodiment, and FIG. 1B is a schematic diagram showing a data capturing method of NFC protocol in an embodiment. Please refer to FIG. 1A and FIG. 1B, the NFC electronic device 100 may be a mobile phone with an NFC function, a smart phone, a computer, a notebook computer, a tablet computer or a deformable tablet computer. The NFC electronic device 100 includes an NFC device 110, a processing unit 120 and a storage unit 130.

The NFC device 110 transfers and receives data from a readable element 200 via an NFC protocol. The NFC device 110 may be, but not limited to an active NFC reading device, and it gives out a connection request signal to other NFC devices by generating a radio frequency field. Thus, when the readable element 200 with an NFC tag 210 approaches the NFC electronic device 100, the NFC device 110 transfers information to the NFC tag 210 of the readable element 200, and the NFC tag 210 gives a response to the NFC electronic device 100 via the radio frequency field generated by the NFC device 110. If the NFC tag 210 is an active type and includes a power resource, the NFC tag 210 can also generate an electric field to give a response to the NFC electronic device 100. The readable element 200 may be a portable NFC product, such as an inductive chip card like a watch. The type of the readable element 200 is not limited.

The storage unit 130 may be one or a combination of a random access memory (RAM), a read-only memory (ROM), a flash memory and a hard disk, which is not limited herein, and it records multiple modules which can be executed by the processing unit 120. The modules can load the processing unit 120 to capture data of the NFC protocol. Furthermore, the storage unit 130 also records at least one operation system, such as the Windows 8 developed by the Microsoft Company, to make the NFC electronic device 100 operate normally.

The processing unit 120 may be one or a combination of a central processing unit (CPU), a programmable microprocessor for a general or specified purpose, a digital signal processor (DSP), a programmable controller, an application specific integrated circuits (ASIC) and a programmable logic device (PLD). The processing unit 120 is connected to the NFC device 110 and the storage unit 130, accesses and executes the modules recorded in the storage unit 130 to capture the data of the NFC protocol.

The modules include an interface drive module 131, a capturing module 132 and an analyzing module 133. The modules may be application programs or drive programs, which is not limited herein. The modules can load the processing unit 120 to capture the data of the NFC protocol. The processing unit 120 also accesses and executes the operation system recorded in the storage unit 130 to make the NFC electronic device 100 operate normally. The operation system includes a kernel mode and a user mode. The data capturing method of the NFC protocol is illustrated as follows.

Figure 2:
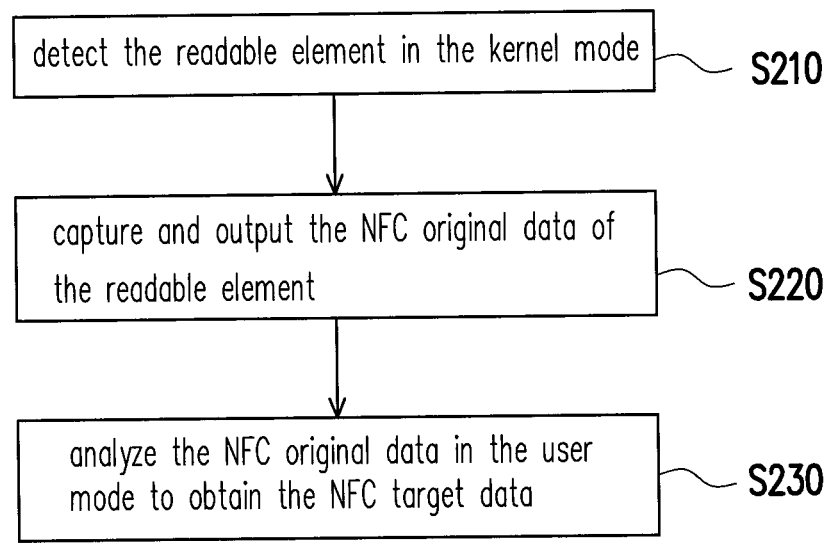
FIG. 2 is a flow chart showing a data capturing method of NFC protocol in an embodiment.

FIG. 2 is a flow chart showing a data capturing method of NFC protocol in an embodiment. Please refer to FIG. 2, the method can be applied to the NFC electronic device 100 in FIG. 1A and FIG. 1B. The method is illustrated with the components of the NFC electronic device 100 as follows.

In step S210, the readable element 200 is detected in the kernel mode. The NFC electronic device 100 detects the readable element 200 via the interface drive module 131 in the kernel mode to obtain NFC original data of the readable element 200. Specifically, when the processing unit 120 executes the interface drive module 131, the NFC device 110 is drived to detect whether another NFC device exists. When the readable element 200 is detected, the interface drive module 131 drives the NFC device 110 to transfer data with the readable element 200 via the NFC protocol. Thus, the NFC original data transferred by the readable element 200 are obtained via the interface drive module 131. The NFC original data may include multiple types of NFC protocol specification data, such as types of the NFC tag 210 or communication standards between the NFC devices.

In step S220, the NFC original data of the readable element 200 are captured and outputted. The NFC electronic device 100 captures the NFC original data from the interface drive module 131 via the capturing module 132, and outputs the NFC original data to the analyzing module 133 in the user mode. For example, a proximity application program interface (API) provided in Windows8 system cannot transfer the NFC original data to an application program in the user mode. However, although the analyzing module 133 is an application program in the user mode, the NFC original data of the interface drive module 131 can be transferred to the application program in the user mode by taking the capturing module 132 as an output interface of the NFC original data, which improves the flexibility of the NFC.

The capturing module 132 can be directly disposed in the kernel mode, or disposed in a proximity drive module in the user mode. That means, the step of capturing and outputting the NFC original data of the readable element 200 by the capturing module 132 can be executed in the kernel mode or the user mode.

In step S230, the NFC original data are analyzed in the user mode to obtain the NFC target data. After the capturing module 132 captures the data relating to the NFC protocol, the analyzing module 133 further analyzes and obtains the NFC target data. In other words, the NFC original data includes various data relating to the NFC protocol, and the analyzing module 133 selects specified data needed by other application programs or itself. For example, the NFC target data may a unique identification (UID) of the readable element 200 or types of an NFC card, which is not limited herein. The capturing module 132 may be disposed in a proximity drive program of the user mode, or directly disposed in the kernel mode and is connected to the interface drive module, which is illustrated as follows.

Figure 3A:
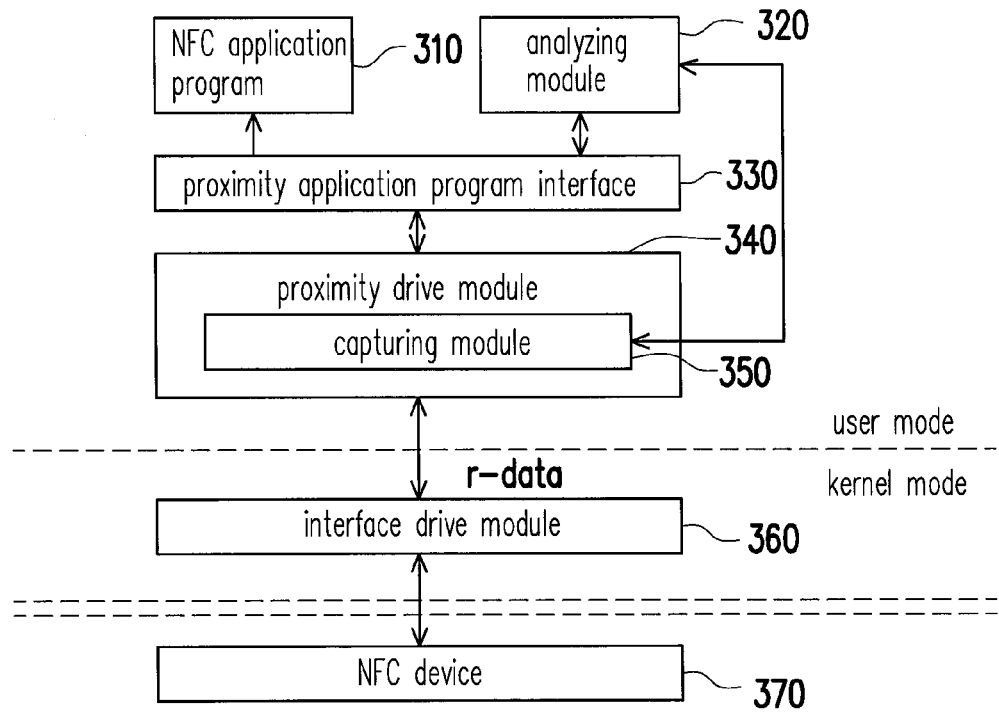
FIG. 3A is a schematic diagram showing a data capturing method of NFC protocol in an embodiment.

FIG. 3A is a schematic diagram showing a data capturing method of NFC protocol in an embodiment. Please refer to FIG. 3A, in the embodiment, the capturing module 350 is disposed in the proximity drive module 340 of the user mode as an interface between the interface drive module 360 and the analyzing module 320. The proximity drive module 340 may be an NFC proximity driver, which is not limited herein. Thus, the capturing module 350 can be regarded as a data output interface in the proximity drive module 340 to output the NFC original data r_data of the interface drive module 360.

The analyzing module 320 can communicate with the proximity drive module 340, and thus the capturing module 350 outputs the NFC original data r_data to the analyzing module 320. When the NFC device 370 is driven by the interface drive module 360 to detect the readable element, the NFC original data r_data are transferred to the proximity drive module 340. The proximity drive module 340 regards the capturing module 350 as a data output interface, and outputs the NFC original data r_data to the analyzing module 320. Additionally, the proximity drive module 340 can first analyzes the NFC original data r_data, and then transfers the analyzed data to the analyzing module 320 via the capturing module. Both the NFC application program 310 and the analyzing module 320 can execute the NFC operation provided by the operation system via the proximity application program interface 330. However, compared with the analyzing module 320, since the NFC application program 310 is not connected to the capturing module 350, it cannot obtain the original data relating to the NFC protocol.

Figure 3B:
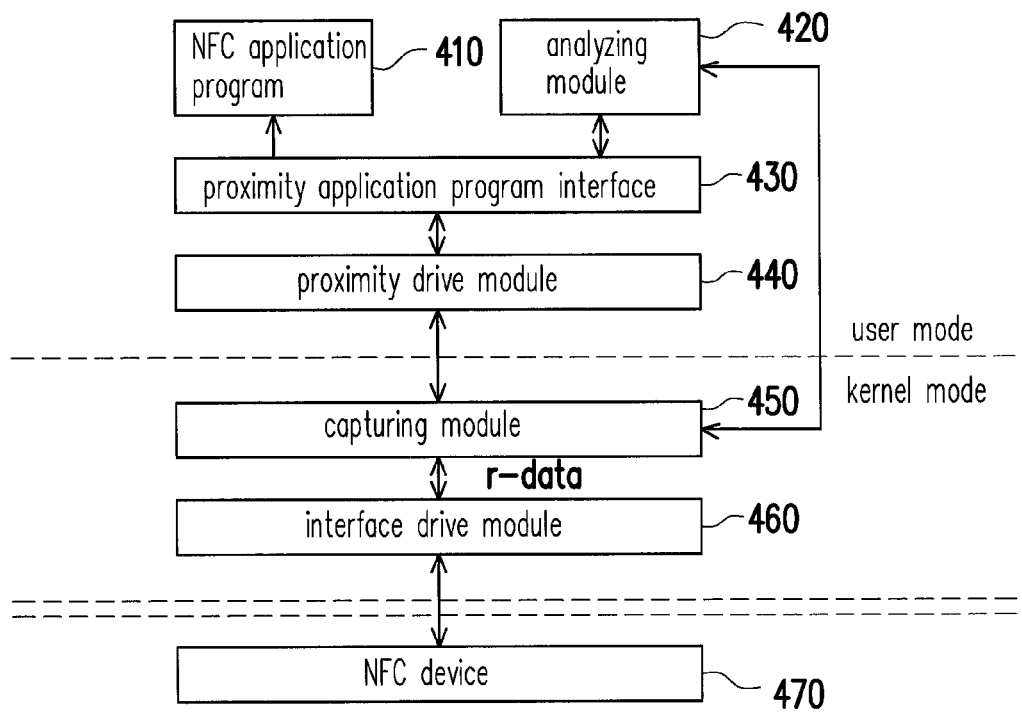
FIG. 3B is a schematic diagram showing a data capturing method of NFC protocol in an embodiment.

FIG. 3B is a schematic diagram showing a data capturing method of NFC protocol in an embodiment. Please refer to FIG. 3B, in the embodiment, the capturing module 450 is disposed in the kernel mode and regarded as an interface between the interface drive module 460 and the analyzing module 420, and an interface between the interface drive module 460 and the proximity drive module 440. The proximity drive module 440 may be an NFC proximity driver, which is not limited herein. The capturing module 450 can be regarded as a communication bridge between the interface drive module 460 and the analyzing module 420, and it captures the NFC original data r_data outputted by the interface drive module 460 to the analyzing module 420.

That is, the analyzing module 420 can communicate with the capturing module 450, and thus the capturing module 450 can output the NFC original data r_data to the analyzing module 420. When the NFC device 470 is driven by the interface drive module 460 to detect the readable element, the NFC original data r_data are transferred to the capturing module 450 and captured by the capturing module 450, and then the NFC original data r_data are outputted to the analyzing module 420 for further analysis. Moreover, both of the NFC application program 410 and the analyzing module 420 can execute the NFC operation provided by the operation system via the proximity application program interface 430. However, compared with the analyzing module 420, since the NFC application program 410 is not connected to the capturing module 450, it cannot obtain the original data relating to the NFC protocol.

Thus, in the data capturing method of the NFC protocol, the information relating to the NFC protocol can be captured for a further use without changing the proximity application program interface. For example, the captured NFC protocol information can be used as an operation system login credential. The steps of using the NFC protocol data to login the system are illustrated with relating embodiments as follows.

Figure 4:
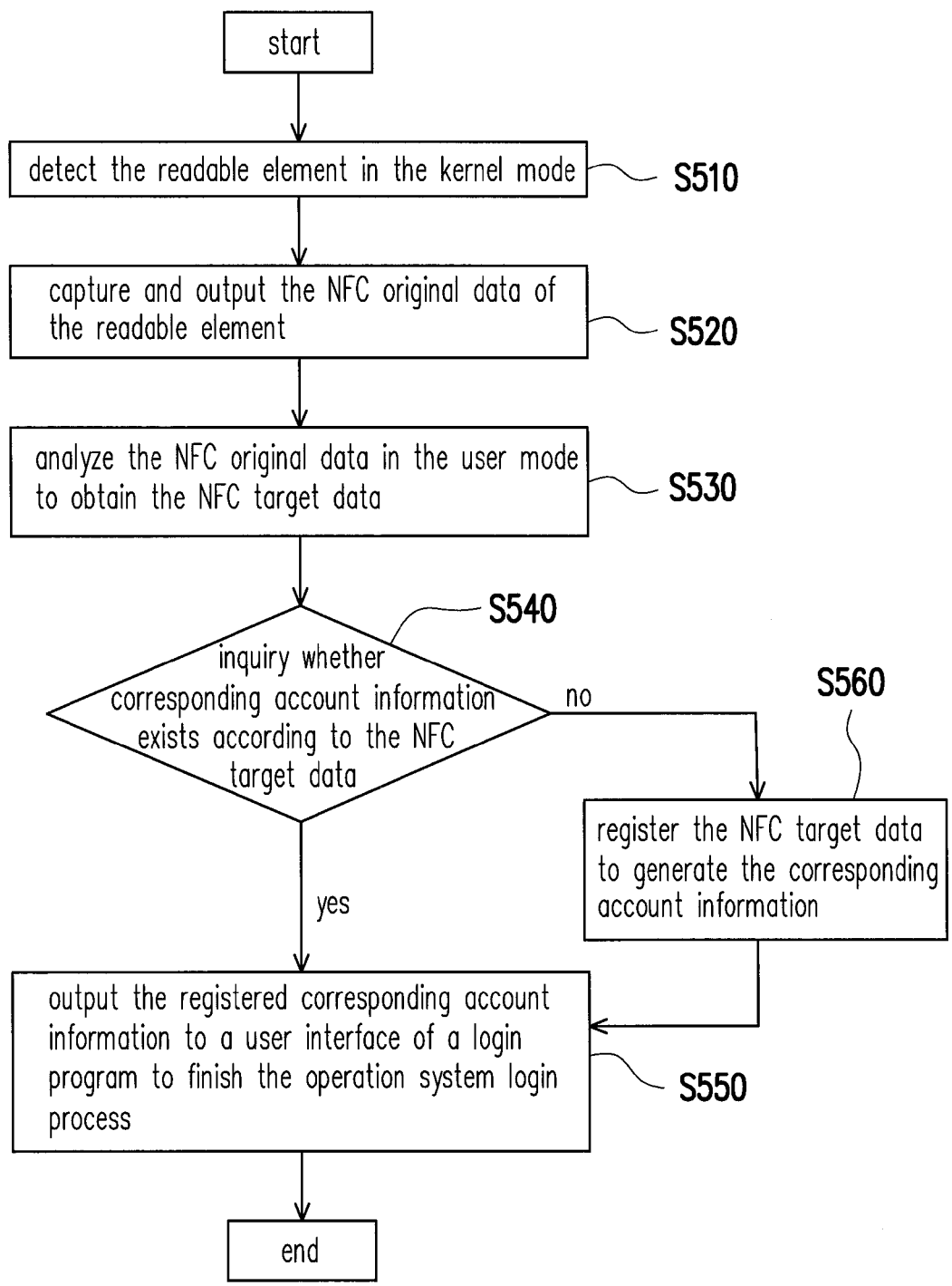
FIG. 4 is a flow chart showing a data capturing method of NFC protocol in an embodiment.

FIG. 4 is a flow chart showing a data capturing method of NFC protocol in an embodiment. Please refer to FIG. 4, the method can be applied to the NFC electronic device 100 in FIG. 1A and FIG. 1B, and the steps in the method are illustrated with the components of the NFC electronic device 100.

In step S510, the interface drive module 131 detects the readable element 200 in the kernel mode to obtain the NFC original data of the readable element 200. In step S520, the capturing module 132 captures and outputs the NFC original data of the readable element 200. In other words, the capturing module 132 captures the NFC original data from the interface drive module 131, and outputs the NFC original data to the analyzing module 133 in the user mode. In step S530, the analyzing module 133 analyzes the NFC original data in the user mode to obtain the NFC target data. The steps S510 to S530 are the same or similar with the steps S210 to S230 in the previous embodiments, which is omitted herein.

After the analyzing module 133 analyzes and obtains the NFC target data, in step S540, the analyzing module 133 inquiries whether corresponding account information exists according to the NFC target data. For example, the analyzing module 133 inquiries whether corresponding account information exists in a database according to the NFC target data. If the inquiring result is "no" in the step S540, it means no corresponding account information is inquired. Then, in step S560, the analyzing module 133 registers the NFC target data to generate the corresponding account information. Furthermore, if no account information corresponding to the NFC target data is inquired, it means the NFC target data are not registered, and the NFC target data are not related to any account information in the database. Thus, the analyzing module 133 executes a register process and builds the corresponding account information in the database according to the NFC target data.

Consequently, when the user wants to login the operation system at the next time, he or she only needs to make the NFC electronic device induct the registered readable element 200, and the NFC electronic device automatically searches the account information meeting the login interface and finishes the operation system login process. Moreover, after the register process is finished and the corresponding account information is built, step S550 is executed, and the analyzing module 133 outputs the registered corresponding account information to a user interface of a login program to finish the operation system login process. The user interface of a login program may be a boot login interface of the Windows operation system.

On the other hand, if the inquiring result is "yes" in the step S540, it means the analyzing module 133 finds the corresponding account information. Thus, in the step S550, the analyzing module 133 directly outputs the corresponding account information to the user interface of a login program to finish the operation system login process. That is, if the inquiring result is "yes" in the step S540, it means the account information corresponding to the NFC target data is already built in the database. The analyzing module 133 can select a group of the account information meeting the user login interface in the database according to the NFC target data, and finish the operation system login process. As stated above, the user only needs to make the readable element 200 inducted, and the NFC electronic device 100 automatically searches the account information meeting the user login interface and finishes the operation system login process. Generally, when the user uses an electronic device to login the operation system, he or she needs to input different account IDs and passwords manually. In the embodiment, the step of inputting the account information manually can be omitted, and the corresponding account information is searched and selected automatically, which simplifies the login process.

In sum, in the data capturing method of the NFC protocol and the NFC electronic device, the NFC electronic device can capture the data relating to the NFC protocol to the analyzing module in a current mode via the capturing module without changing the application program interface. The analyzing module further analyzes the data relating to the NFC protocol, and obtains specified target data for itself or other application programs to use, which improves the flexibility and convenience of the NFC. Moreover, the user login interface of the operation system can execute the login process via the specified data of the NFC protocol, which can ensure the login security and simplify the login process.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A data capturing method of near-field communication (NFC) protocol applied to an NFC electronic device with an operation system, wherein the operation system includes a kernel mode and a user mode, the method comprising following steps:
    detecting a readable element by an interface drive module in the kernel mode to obtain NFC original data transferred by the readable element;
    capturing the NFC original data from the interface drive module by a capturing module and outputting the NFC original data to an analyzing module in the user mode; and
    analyzing the NFC original data by the analyzing module to obtain NFC target data.

2. The data capturing method of the NFC protocol according to claim 1, wherein the step of capturing and outputting the NFC original data of the readable element is executed in the kernel mode.

3. The data capturing method of the NFC protocol according to claim 1, wherein the step of capturing and outputting the NFC original data of the readable element is executed in the user mode.

4. The data capturing method of the NFC protocol according to claim 1, wherein the NFC target data are tags or NFC card types of the readable element.

5. The data capturing method of the NFC protocol according to claim 1, wherein after the step of analyzing the NFC original data to obtain the NFC target data in the user mode, the method further includes:
    inquiring whether corresponding account information exists according to the NFC target data, wherein if the corresponding account information exists, the corresponding account information is outputted to a user interface of a login program to finish a login process of the operation system; if the corresponding account information does not exist, the NFC target data are registered to generate the corresponding account information.

6. A near-field communication (NFC) electronic device with an operation system, wherein the operation system includes a kernel mode and a user mode, the NFC electronic device comprising:
  an interface drive module which is in the kernel mode and detecting a readable element to obtain NFC original data of the readable element;
  a capturing module capturing the NFC original data from the interface drive module and outputting the NFC original data; and
  an analyzing module in the user mode, receiving the NFC original data outputted by the capturing module and analyzing the NFC original data to obtain NFC target data.

7. The NFC electronic device according to claim 6, wherein the capturing module is disposed in a proximity drive module of the user mode, and the capturing module is regarded as an interface between the interface drive module and the analyzing module.

8. The NFC electronic device according to claim 6, wherein the capturing module is disposed in the kernel mode, the capturing module is regarded as an interface between the interface drive module and the analyzing module, and the capturing module is also regarded as an interface between the interface drive module and a proximity drive module.

9. The NFC electronic device according to claim 6, wherein the NFC target data are tags or NFC card types of the readable element.

10. The NFC electronic device according to claim 6, wherein the analyzing module inquires whether corresponding account information exists according to the NFC target data, if yes, the analyzing module outputs the corresponding account information to a user interface of a login program to finish a login process of the operation system; if no, the analyzing module registers the NFC target data to generate the corresponding account information.

* * * * *